UNITED STATES PATENT OFFICE.

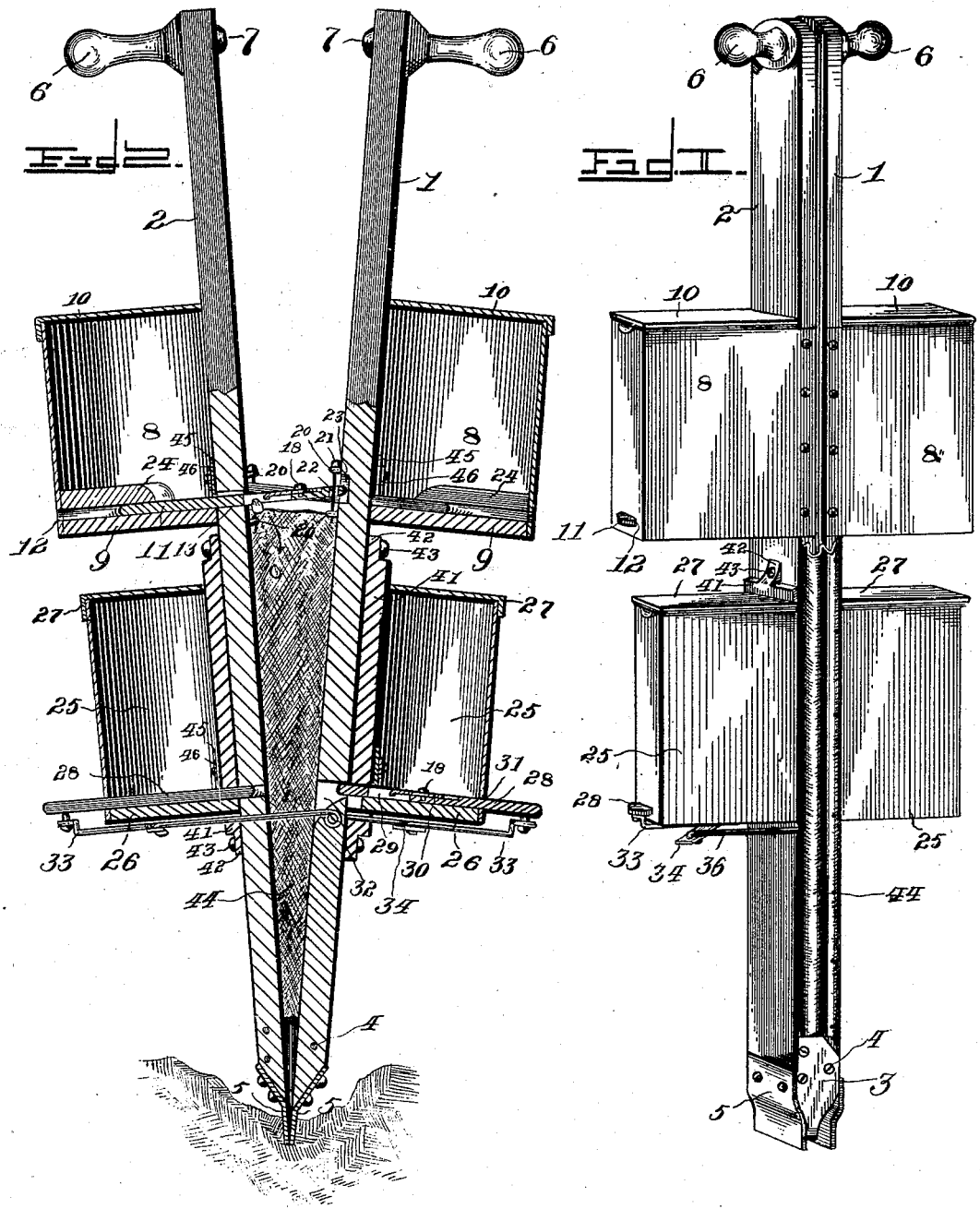

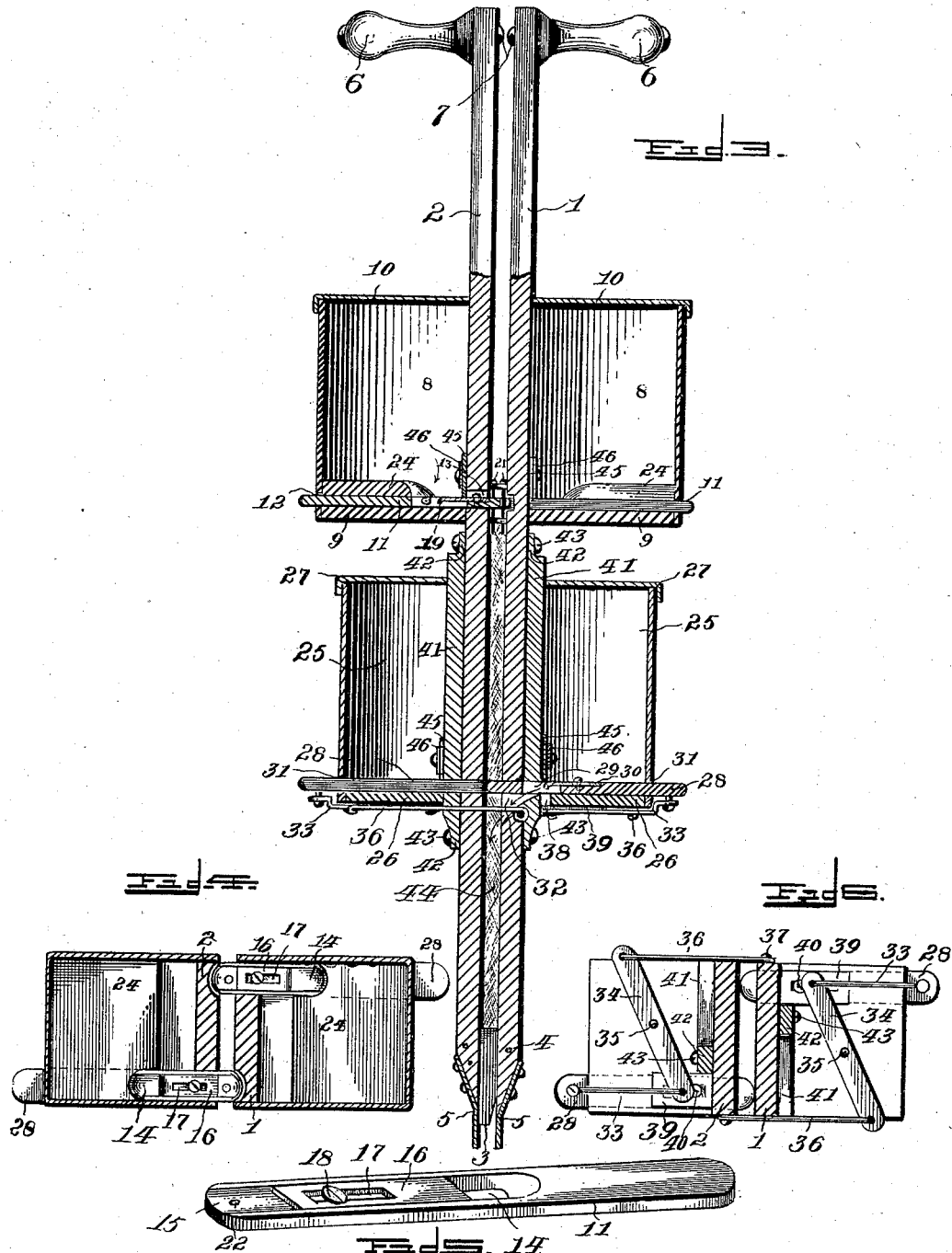

ARNETT CONWAY, OF LOUISVILLE, KENTUCKY, ASSIGNOR OF ONE-HALF TO EDWARD TILDEN PARSONS, OF SAME PLACE.

SEED AND FERTILIZER DROPPER.

SPECIFICATION forming part of Letters Patent No. 647,476, dated April 17, 1900.

Application filed December 9, 1899. Serial No. 739,820. (No model.)

*To all whom it may concern:*

Be it known that I, ARNETT CONWAY, a citizen of the United States, residing at Louisville, in the county of Jefferson and State of Kentucky, have invented a new and useful Seed and Fertilizer Dropper, of which the following is a specification.

This invention relates to seed and fertilizer droppers, and has for one object to provide an improved hand-operated device for successively dropping the seed and fertilizer and to deposit the latter upon the seed or at one side thereof, as desired. It is also designed to provide adjustable means for dropping the seed, so as to accommodate the device to seeds of different sizes, and to prevent the latter from choking and interfering with the proper operation of the device.

A further object is to provide improved operating means for dropping the fertilizer after the seed, so that the latter may be effectively covered, and also to detachably connect the fertilizer proper and its dropping mechanism to the device, so that the latter may be used independently of the fertilizer.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the appended claims without departing from the spirit or sacrificing any of the advantages of the invention.

In the drawings, Figure 1 is a perspective view of a seed and fertilizer dropper constructed in accordance with the present invention. Fig. 2 is a longitudinal sectional view thereof, showing the device in position for dropping the seed. Fig. 3 is a similar view of the device in position for dropping the fertilizer. Fig. 4 is a transverse horizontal sectional view taken through the seed-hoppers. Fig. 5 is a detail perspective view of the seed-dropping slide. Fig. 6 is a bottom plan view of the fertilizer-hoppers and illustrating the means for operating the fertilizer-slides.

Corresponding parts in the several figures of the drawings are designated by like characters of reference.

Referring to the accompanying drawings, 1 and 2 designate opposite arms or members, which are preferably formed of flat wooden bars hingedly connected at their lower ends by means of the metallic plates 3, secured to the opposite edges of one of the members, and the other member being connected to each plate by means of a suitable pivot connection 4. The lower ends of the members are beveled inwardly, and to these beveled ends are connected the angle-plates 5, which form jaws for entering the ground. At the opposite upper ends of the members are provided the outwardly-projecting handles 6, and upon the inner sides of the members, adjacent to the handles, are provided suitable stop-shoulders 7, so as to prevent contact of the inner sides of the members.

Secured to the outer side of each member and near the upper end thereof is a seed-hopper 8, of any preferred form, having a flat bottom 9 and a removable cover 10, preferably slidable outward from the member. Located within the hopper and supported upon the bottom thereof is a seed-slide 11, which is designed to move longitudinally in opposite directions through openings 12 and 13, formed in the outer side of the hopper and through the adjacent member or arm, respectively. This slide is preferably formed from a flat strip of wood, having an intermediate opening 14, and a longitudinal groove 15, formed upon the upper face of the slide, in the inner end thereof, and communicating with the opening 14. Fitted in this groove is a metallic plate 16, having a longitudinal slot 17 for the reception of a screw-threaded fastening 18, so that the plate may be adjusted longitudinally upon the slide. At the inner end of the slide there is provided a transverse pendent flange or shoulder 19, which is received within the opening 14, so as to vary the size of the opening by reason of the adjustment of the plate. The purpose of adjusting the opening in the slide is to accommodate the latter to seeds of different sizes, as will be understood. The inner end of the slide normally projects beyond the adjacent arm or member and is adjustably connected to the opposite member, so that said slide is operated by the latter member, and to bring the opening 14 between the two members, so as to drop the seeds. To accommodate the slide to the movement of the opposite members, the inner end of the slide has an automatic vertically-adjustable connection with its operating member, and such connection comprises opposite eyes 20, provided upon the inner side of the member and located above and below the slide, and a headed pin 21, passing through the eyes and loosely through an opening 22, formed in the slide, the inner end of the latter being received within a socket or recess 23, formed in the inner face of the member. As indicated in Fig. 2, the slide 11 assumes an inclined position when the members 1 and 2 are separated, and the inner end of the slide moves automatically upon the pin 21, so as to permit of the slide assuming this position and to prevent the same from binding within the opening 13. It will be understood that the pins 21 are removable from the respective pairs of vertically-alined eyes in order that the slides may be replaced when broken or worn. By reference to Fig. 4 it will be seen that the slides of the opposite hoppers are arranged at opposite sides thereof, so as not to interfere with the operation of each other. In order that the inner end of the slide may not be choked by the seed in the hopper, there is provided a partition 24, which covers the inner end of the slide and forms a guard therefor to prevent the seed from accumulating in the rear of the slide, and thereby choking or interfering with the movement thereof. It will be noted that this guard does not entirely cover the slide, whereby the seed has free access to the opening 14, so as to be drawn out of the hopper by the forward movement of the slide.

Located immediately below each seed-hopper is a fertilizer-hopper 25, having a flat bottom 26 and a removable cover 27, as described for the seed-hopper. Located within the fertilizer-hopper and supported upon the bottom thereof is a slide 28, having a feed-opening 29, and an adjustable plate 30, substantially as described for the seed-slide. This fertilizer-slide has a longitudinal movement in opposite directions and passes through an opening 31, formed in the outer side of the hopper, and an opening 32, formed in the adjacent arm or member, this latter opening being comparatively large and having its lower wall beveled or inclined downwardly and inwardly, so as to facilitate the discharge of the fertilizer.

The means for operating the fertilizer-slide comprises a link 33, which is connected to the under side of the outwardly-projecting end of the slide and is located exteriorly at the bottom of the hopper. The inner end of this link is connected to the adjacent end of a rocking arm 34, which is pivoted intermediate of its ends to the bottom of the hopper, as indicated at 35. To the opposite end of this rocking arm is connected a second link 36, which is located upon the opposite side of the device and is also connected to the outer edge of the opposite member, as indicated at 37. By this construction it will be seen that when the members 1 and 2 are opened or separated the respective locking-arms 34 will be operated through the links 36, so as to move the slides 28 outwardly, thereby bringing the openings 29 within the respective hoppers, so as to receive the fertilizer. When the members are closed or brought together, the slides will be moved inwardly, so as to bring the openings 29 into communication with the exit-openings 32, formed in the respective members 1 and 2, whereby the fertilizer will be discharged between said members.

In some instances it may be desirable to discharge the fertilizer exteriorly of the members, and therefore I have provided an exit-opening 38 through the bottom of the hopper, adjacent to the inner side thereof and over which the slide 28 passes, so that the fertilizer may be discharged through this opening before it reaches the opening 32. Secured to the under side of the hopper is a slotted plate 39, normally closing the opening 38 and provided with a suitable fastening 40, passing through the slot of the plate and into the bottom of the hopper, so that the plate may be adjusted longitudinally to open or close the opening 38.

The inner side 41 of each hopper 25 preferably extends beyond the top and bottom thereof, so as to form-attaching ears 42 for the reception of fastenings 43, whereby the hopper may be detachably secured to the device.

Located at opposite sides of the device, extending from the hinged ends of the members 1 and 2 upwardly to the seed-hoppers, are strips of flexible material 44, which have their opposite longitudinal edges secured to the opposite edges of the respective members, so as to form a tube or chute for the seed and fertilizer, such flexible material being of a size to permit of the proper operation of the device.

The upper side of the inner end of each slide is swept by means of a brush 45, formed of rubber or other flexible material and secured to the outer side of the adjacent arm or member immediately above the slide and within the respective hoppers, so as to prevent the seed and fertilizer from becoming wedged between the slide and the discharge-opening in the adjacent member. This brush is held in place by means of a transverse clamping-strap 46, so as to be vertically adjustable for taking up wear.

In the operation of the device the members 1 and 2 are closed and the plates or jaws 5 inserted into the ground, after which the members are opened or separated upon their hinge connection as a center, thereby drawing the seed-slides inwardly, so as to drop the seeds into the tube formed by the opposite members and the pieces of flexible material 44. When the members are again brought together, the seed-slides are forced backwardly into the respective seed-hoppers and the fertilizer-slides are forced forwardly, so as to discharge the fertilizer through the openings 29 and 32 into the tube and upon the seeds previously deposited therein. It will thus be apparent that the seeds are discharged first and the fertilizer afterward, so that the seeds may be effectively covered by the fertilizer.

What I claim is—

1. A combined seed and fertilizer dropper, comprising opposite hingedly-connected members forming a chute or seed-tube, a seed-hopper, and a fertilizer-hopper carried by the members, and means for alternately dropping the seed and fertilizer.

2. A combined seed and fertilizer dropper, comprising opposite hingedly-connected members forming a chute or tube, superposed seed and fertilizer hoppers carried by the members, and means for dropping the seed prior to the fertilizer.

3. A planter, comprising opposite hingedly-connected members, hoppers carried by the members, dropping-slides operating in the respective hoppers, certain of the slides being operatively connected to and movable in the same direction with the respective opposite member, and other slides operatively connected to and moving in an opposite direction to the respective opposite member.

4. A planter, having pairs of opposite hoppers, slides in the hoppers, and means for operating one pair of slides in opposite directions to other pairs of slides.

5. A planter, having hoppers, opposite hingedly-connected members carrying the respective hoppers, dropping-slides working in the hoppers, and means for simultaneously operating certain of the slides inwardly and certain of the other slides outwardly.

6. A combined seed and fertilizer dropper, comprising opposite hingedly-connected members forming a chute or seed-tube, a seed-hopper carried by one of the members, a dropping-slide working in the hopper, and having an operative connection with the opposite member, and a fertilizer-hopper carried by one of the members, and having a dropping-slide, a rocking arm, a link connecting the slide with one end of the rocking arm, and another link connected to the opposite end of the rocking arm, and also to the opposite member.

7. A planter, comprising opposite hingedly-connected members, hoppers carried by the respective members, dropping-slides for the respective hoppers, operative connections between the inner ends of some of the slides and the respective opposite member, and operative connections between the outer or rear ends of other slides and the respective opposite member.

8. A planter, comprising opposite hingedly-connected members, a hopper carried by one of the members, a dropping-slide working in the hopper, a rocking arm pivoted to the bottom of the hopper, a link connecting the slide to one end of the rocking arm, and another link connected to the opposite end of the arm, and also to the opposite member.

9. A planter, comprising opposite hingedly-connected members, a hopper carried by one of the members, a slide working in the hopper, and normally projecting at the outer side thereof, a rocking arm pivoted intermediate of its ends to the exterior of the bottom of the hopper, a link connected to the projecting end of the slide, and to the adjacent end of the rocking arm, and another link located at the opposite side of the hopper, connected to the opposite end of the rocking arm, and also to the adjacent outer edge of the opposite member.

10. A planter, having a hopper, a seed-tube in communication therewith, and means for discharging the contents of the hopper into the tube, or exteriorly thereof.

11. A planter, comprising opposite hingedly-connected members, forming a tube, a hopper carried by one of the members, and means for discharging the contents of the hopper into the tube, or exteriorly thereof.

12. A planter, having a hopper, provided with a plurality of exit-openings, and means for discharging the contents of the hopper through any of the openings.

13. A planter, having a hopper, provided with a plurality of exit-openings, a dropping-slide coöperating with the openings, and means for closing one of the latter.

14. A planter, having a hopper, provided with a pair of openings extending at substantially right angles, a dropping-slide moving across one of the openings and through the other opening, and means for closing the former opening.

15. A planter, having a hopper, provided with a pair of adjacent openings formed through one side and the bottom of the hopper, respectively, a slide moving across the bottom opening and through the side opening, and an adjustable slide mounted upon the exterior of the bottom and closing the opening therein.

16. A planter, comprising opposite hingedly-connected members, a hopper carried by one of the members, and provided with an opening extending through the adjacent member, and another opening formed through the bottom of the hopper and exteriorly of said member, a slide working across the bottom opening, and through the opening in the member, and means for closing the bottom opening.

In testimony that I claim the foregoing as my own I have hereto affixed my signature in the presence of two witnesses.

ARNETT CONWAY.

Witnesses:
W. H. CIPES,
E. T. PARSONS.